[19] United States Patent
Kuwano et al.

[11] Patent Number: 5,761,354
[45] Date of Patent: Jun. 2, 1998

[54] OPTICAL COUPLING SYSTEM AND OPTICAL MODULE

[75] Inventors: Hideyuki Kuwano, Yokohama; Satoshi Aoki, Chigasaki, both of Japan

[73] Assignee: Hitachi, Ltd., Tokyo, Japan

[21] Appl. No.: 694,243

[22] Filed: Aug. 8, 1996

[30] Foreign Application Priority Data

Aug. 10, 1995 [JP] Japan ................... 7-204622

[51] Int. Cl.$^6$ ........................ G02B 6/32
[52] U.S. Cl. ................ 385/33; 385/93; 385/34
[58] Field of Search ................ 385/33, 34, 35, 385/93

[56] References Cited

U.S. PATENT DOCUMENTS

| 5,112,122 | 5/1992 | Chikuma et al. | 385/33 |
| 5,293,269 | 3/1994 | Burkhart et al. | 359/719 |
| 5,442,487 | 8/1995 | Mizuno | 359/784 |

FOREIGN PATENT DOCUMENTS

| 0 371 795 A2 | 6/1990 | European Pat. Off. . | |
| 57-176014 | 10/1982 | Japan | 385/33 |
| 58-134614 | 8/1983 | Japan | 385/33 |
| 4-114117 | 4/1992 | Japan . | |
| 5-333245 | 12/1993 | Japan . | |

*Primary Examiner*—John Ngo
*Attorney, Agent, or Firm*—Antonelli, Terry, Stout, & Kraus, LLP

[57] ABSTRACT

An optical coupling system and optical module having a light emitting device for emitting light having different beam spread angles in vertical and horizontal directions. The optical coupling system and module include a first lens for changing the emitted light into parallel rays, a beam shaping and aberration correction device for expanding or contracting a beam cross section of the parallel rays only in a horizontal or vertical direction and for correcting for aberration. Further, a second lens is provided for converging the shaped aberration corrected beam onto an optical fiber for receiving the converged light with an improved coupling efficiency. The aberration correction corrects for astigmatism.

16 Claims, 3 Drawing Sheets

ΔZ=ASTIGMATISM

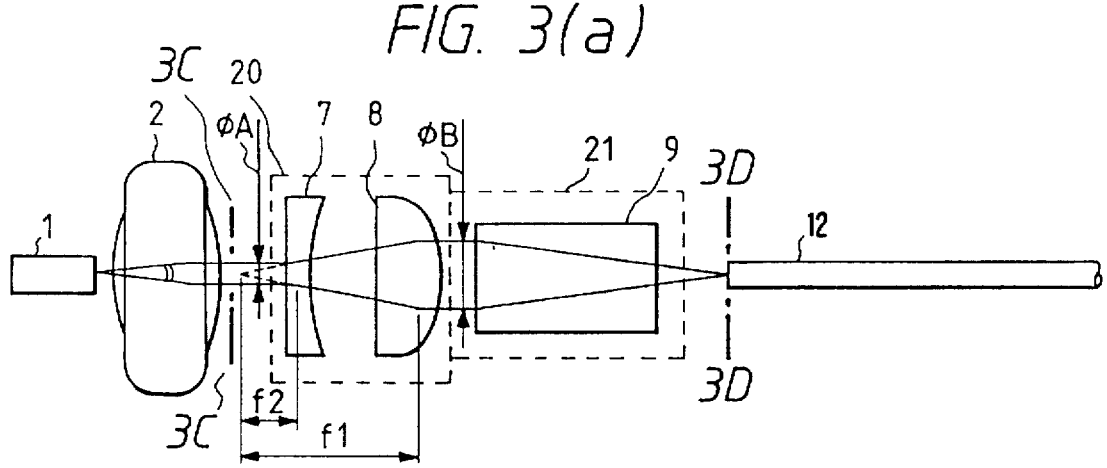
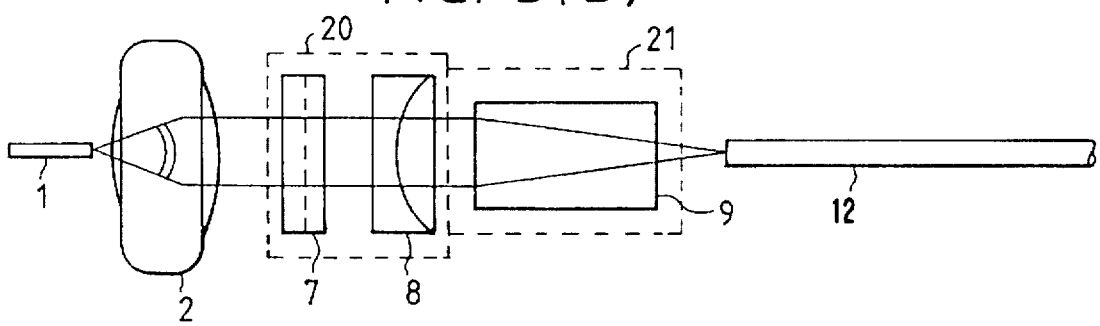
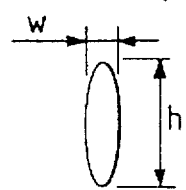 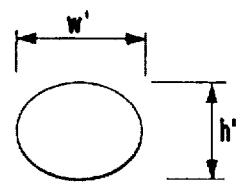

OPTICAL COUPLING SYSTEM AND OPTICAL MODULE

The present invention relates to an optical coupling system and optical module and, more particularly, to an optical coupling system and optical module for guiding emitted light from a light emitting device which emits light having different beam spread angles in vertical and horizontal directions into an optical fiber or the like with high coupling efficiency, and for producing small variation in the optical output even if subjected to thermal stress.

BACKGROUND OF THE INVENTION

In a conventional coupling system for coupling a light beam from a light source, such as a laser diode emitting light with different beam spread angles in the vertical and horizontal directions to an optical fiber, generally a first and a second lens is utilized. As shown in FIG. 1(a), a light emitting device such as a laser diode emits a light beam to an optical fiber 12 via coupling lenses 2 and 9 where lens 2 is a collimating lens for forming generally parallel light rays such as an aspherical lens and providing an optical beam having a cross-sectional beam shape at line 1B—1B as shown in FIG. 1(b), where the dimensions in the vertical (h) and horizontal (w) directions are different so that the beam aspect ratio is about 4:1. A converging lens 9 such as a GRIN (gradient of refractive index) lens is utilized for converging the light from lens 2 onto the optical fiber 12 and this lens converts the previous cross-sectional shape beam to a cross-sectional aspect ratio as indicated at line 1C—1C, and as shown in FIG. 1(c), where the dimension in the vertical (h') and horizontal (w') directions are different so that the beam aspect ratio is about 1:4AA. Due to the cross-sectional shape or large beam aspect ratio, the coupling efficiency is low.

In a prior arrangement of an optical coupling system, it has been proposed that a concave cylindrical lens 7 be inserted between the first lens 2 and the second lens 9 for expanding or contracting the cross section of the beam only in one of the vertical or horizontal directions, as shown in FIGS. 2(a) and 2(b). In such a structure, light emitted from the light emitting device 1, which emits light having different beam spread angles in vertical and horizontal directions, is changed by the first lens 2 into parallel rays whose beam cross section takes on an elliptical or flattened circular form is shaped by the lens 7 to a beam having an improved beam aspect ratio in an attempt to achieve a circular form and, the converged light which is converged by the second lens 9 is introduced into the inlet end face of the optical fiber 11 to thereby improve the optical coupling efficiency. Such a structure is disclosed in Japanese Laid-open No. 5-333245 (1993), wherein the collimating lens and the cylindrical lens are held by the same holding member. Although the structure as shown in FIG. 2(a) and 2(b) wherein a cylindrical lens 7 is inserted between the first lens 2 and the second lens 9 improves the optical coupling efficiency, there is a disadvantage in that the focusing point of the converged light differs in the vertical and horizontal directions resulting in astigmatism. A loss of coupling efficiency is produced due to the astigmatism caused by the use of the cylindrical lens 7 for contracting or expanding the beam.

Japanese Laid-open No. 57-167014 (1982) discloses improvement of efficiency of coupling by arranging two semicylindrical lenses opposite to each other so that the axial cores thereof extend at right angles to one another for converting circular luminous flux from a light source to a vertical line or a horizontal line at different points so as to efficiently couple an optical fiber with a plane type waveguide, for example.

SUMMARY OF THE INVENTION

An object of the present invention is to provide an optical coupling system and optical module for guiding emitted light from a light emitting device which emits light having different beam spread angles in vertical and horizontal directions into an optical fiber or the like with high coupling efficiency, and for producing substantially no variation in the optical output even when subjected to thermal stress.

Another object of the present invention is to provide an optical coupling system and optical module for coupling light from a light emitting device such as a semiconductor laser to an optical fiber with high coupling efficiency utilizing a correction device for correcting for aberration, and in particular, correcting for astigmatism.

In accordance with the present invention, the optical coupling system and optical module comprise a light emitting device which emits light having different beam spread angles in vertical and horizontal directions, a first lens for changing the emitted light into parallel rays, a beam shaping and aberration correction device for expanding or contracting the cross section of the beam of the parallel rays in only one of the vertical and horizontal directions and for correcting aberration such as astigmatism, a second lens for converging the aberration corrected beam, and an optical fiber for receiving the converged beam.

According to another feature of the present invention, the optical module includes a fixing member for integrally fixing the beam shaping and aberration correcting device and the second lens thereon.

According to a further feature of the present invention, it is desirable to form the beam shaping and aberration correcting device of a cylindrical lens. More particularly, concave and convex cylindrical lenses serving respectively as the beam shaping device and the aberration correcting device are disposed between the first and second lenses.

In accordance with the present invention, the light from the light emitting device enters the first lens and the beam converged by the second lens enters the optical fiber. When the beam spread angles of the emitted light from the light emitting device are different in vertical and horizontal directions, the beam shaping device first performs beam shaping on the parallel rays produced by the first lens by, for example, expanding or contracting the cross section of the beam only in its vertical or horizontal direction, thereby decreasing the difference between its height and width or improving its roundness or circularity. By performing such an optical process, the converged light provided by the second lens takes virtually the same form as that of the mode field of the optical fiber and the optical coupling efficiency is improved. Further, by providing that aberration such as astigmatism is corrected by the aberration correcting device, the loss due to the aberration can be reduced and providing improved coupling efficiency.

According to another feature of the present invention, by fixing the beam shaping device, the aberration correcting device, and the second lens on a common fixing member, variation in relative positions between the optical devices become smaller because they move integrally with each other even if thermal stress is applied to them, and therefore deviation from the optical axis, deviation from the focal point and the like can be reduced and variation in the output optical power can be reduced.

These and other objects, features and advantages of the present invention will become more apparent from the

3 following description when taken in conjunction with the accompanying drawings.

BRIEF DESCRIPTION OF THE DRAWING

FIGS. 3(a)–3(d) illustrate a top view of the coupling system of the present invention showing the cross-sectional beam shape in FIGS. 3(c) and 3(d)

DESCRIPTION OF THE PREFERRED EMBODIMENT

Figure 1A:
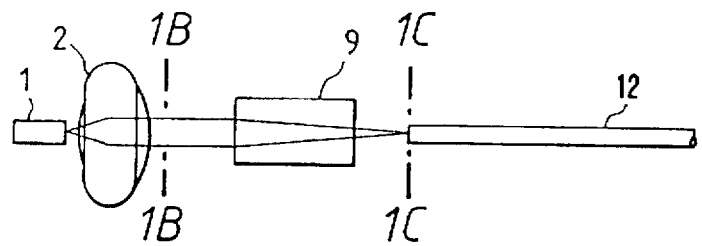
FIGS. 1(a)–1(c) illustrate a top view of a conventional coupling system having a cross-sectional beam shape as shown in FIG. 1(b) and FIG. 1(c)
Figure 1B:
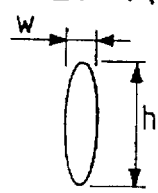
Figure 1C:
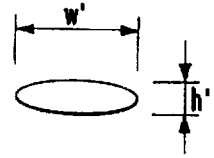
Figure 2A:
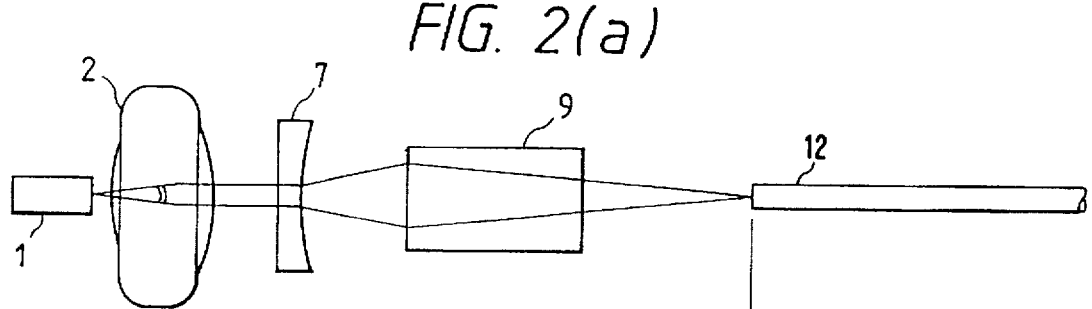
FIGS. 2(a) and 2(b) illustrate in top view and side view of a prior art coupling system having astigmatism.
Figure 2B:
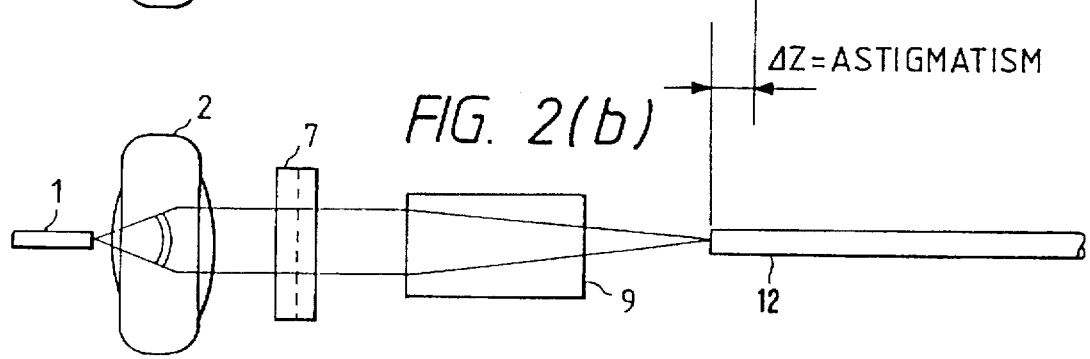

Referring now to the drawings wherein like reference numerals are utilized to designate like parts, the present invention is described below with reference to FIGS. 3(a)–3(d) and FIG. 4.

FIGS. 3(a) and 3(b) show a top view and side view of the coupling system of the present invention, wherein light emitted from a light emitting device such as a semiconductor laser 1 enters a first lens 2 which is an aspherical lens and providing a light beam shape which is elliptical having a beam aspect ratio of 4:1, wherein the height (h) of the beam in the vertical direction is 4 times as great the width (w) of the beam in the horizontal direction, as illustrated in FIG. 3(c). A beam shaping and aberration correcting device 20 including a concave cylindrical lens 7 having a focal length f2 and a convex cylindrical lens 8 having a focal length f1, as illustrated in FIG. 3(a), are arranged so as to reduce the beam aspect ratio and correct for astigmatism while providing an expansion of $\phi B/\phi A = f1/f2 = 3$. A converging device 21 such as second lens 9 in the form of a GRIN lens converges the light so as to enter the optical fiber 12 and to have a cross-sectional beam shape of substantial roundness or circularity, as illustrated in FIG. 3(d), where the astigmatic corrected beam has an aspect ratio of 3:4, thereby providing improved coupling efficiency.

Figure 4A:
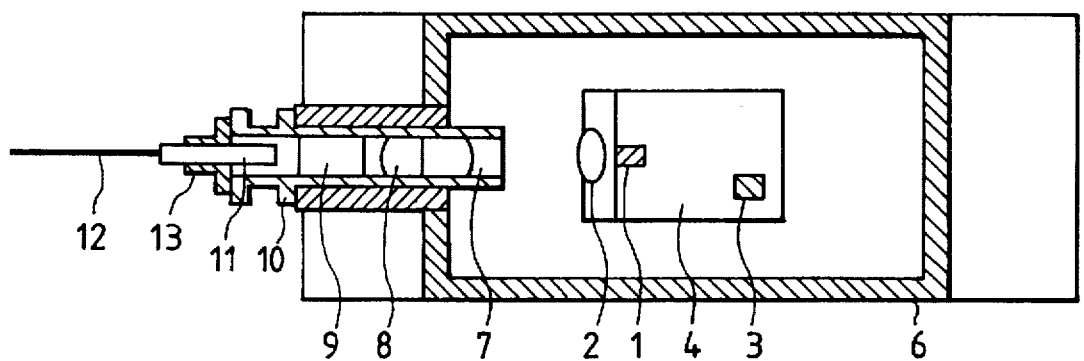
FIGS. 4(a) and 4(b) illustrate a top view and side view of the coupling system and optical module of the present invention.
Figure 4B:
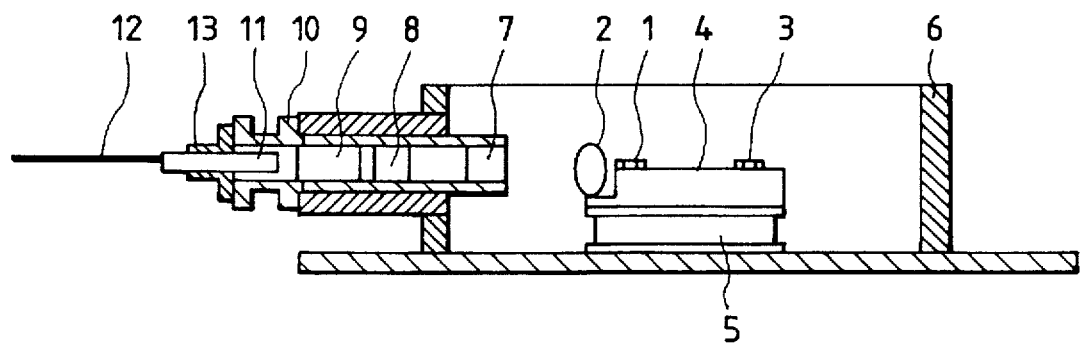

FIGS. 4(a) and 4(b) show a top view and side view of an optical module in accordance with the present invention, mounting thereon the semiconductor laser 1 of which the ratio between the height and width of the emitted beam spread angle is 4:1. The semiconductor laser 1, which is a pumping laser, is a light emitting device of which the ratio between the height and width of the emitted beam spread angle is 4:1. A laser drive circuit and necessary wirings are not shown in the drawing. A thermistor 3 serves for detecting temperature and is fixed in place on a stem 4. The stem 4 is fixed on a cooling surface of a thermoelectron cooling device 5, and the thermoelectron cooling device 5, integrally formed with the stem 4, is fixed on a bottom face of a case or housing 6. The thermoelectron cooling device 5 may be a Peltier device.

Although there is provided a control circuit for controlling the thermoelectron cooling device 5 in accordance with the temperature detected by the thermistor 3, such a control circuit is known and not related with the characteristic point of the present invention so that the control circuit and necessary wirings are not shown in the drawing.

As illustrated, the first lens 2, disposed on the stem 4, is a collimating device such as an aspherical lens for changing the emitted light from the semiconductor laser 1 into parallel rays. Although parallel rays are desired from an idealistic point of view, the rays may be pseudo parallel rays.

The concave cylindrical lens 7 is a device for expanding or contracting the beam of the parallel rays (or pseudo parallel rays) only in a width or height direction in the beam cross section. In the present embodiment, the lens 7 is set to have the function to expand the beam cross-section three times in its width direction. The convex cylindrical lens 8 is a device for correcting astigmatism and its actual form is determined in accordance with the required correction of the astigmatism. The second lens 9 is a device such as a GRIN lens for converging the light corrected for astigmatism and enabling the converged light to enter the end face of the optical fiber 12.

The concave cylindrical lens 7, the convex cylindrical lens 8, and the second lens 9 are integrally fixed in predetermined positions on a cylindrical supporting member 10 with a strong bonding agent such as glass with a low melting point and Au/Sn solder. Further, the cylindrical supporting member 10 is fixed on the case 6 by, for example, YAG laser welding. The optical fiber 12, which is provided with a ferrule 11, is fixedly supported by a fiber holder 13. The fiber holder 13 is fixed to the end portion of the cylindrical supporting member 10 by Au/Sn soldering.

The operation of the optical module is such that, at first, a laser beam emitted from the semiconductor laser 1 of which the beam spread angle has a height-to-width ratio of 4:1 is changed by the first lens 2 into parallel rays with an elliptical beam cross section. Then, the parallel rays are expanded only in the width direction in the beam cross section by the concave cylindrical lens 7. Thereafter, astigmatism is corrected by the convex cylindrical lens 8. Then, the beam corrected for astigmatism is converged by the second lens 9 and enters the optical fiber 12 so that high efficiency optical coupling is achieved.

At this time, the beam converged into the inlet end face of the optical fiber 12 is shaped so that the ratio of the height to width of the cross section of the beam becomes 4:3. Namely, since the concave cylindrical lens 7 has the function to triple the cross section of the beam only in the width direction, the beam with the ratio of the height to width of 4:1 is shaped so as to have the height-to-width ratio being 4:1×3=4:3. Then the second lens 9 converts the height-to-width ratio to about 3:4 with the astigmatism being corrected.

According to experiments conducted by the present inventors, an experimental value of the optical coupling efficiency of −1.2 dB was obtained and it was determined that the optical coupling efficiency was improved by 1.5 dB as compared with the case where the beam shaping is not effected.

Further, by integrally fixing the concave cylindrical lens 7, the convex cylindrical lens 8, and the second lens 9 on the supporting member 10, variation in the relative positions between the devices can be kept low even when subjected to thermal stress, and variation in the optical output can be greatly reduced. According to experiments conducted by the present inventors, it was determined that the variation in the optical output from the fiber could be kept 10% or below when the ambient temperature was changed from −20 degrees to +85 degrees.

According to the present invention, as described above, since there is provided a device for beam shape correction and astigmatism correction including at least one cylindrical lens inserted between the first lens and the second lens, the efficiency of the optical coupling with another optical wave guide device such as an optical fiber can be improved.

Further, by the provision of the fixing member for integrally fixing the beam shaping device, the aberration correcting device, and the second lens thereon, variation in relative positions between the devices can be kept down even when subjected to thermal stress and therefore variation in the optical output can be greatly reduced.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

I claim:

1. An optical coupling system comprising:

a light emitting device for emitting light having different beam spread angles in vertical and horizontal directions;

a first lens for changing the emitted light into first parallel light rays;

a beam shaping and aberration correction device for changing an aspect ratio of a beam cross section of the first parallel light rays only in a horizontal or vertical direction, for changing the first parallel light rays into second parallel light rays and for correcting for aberration so as to provide a shaped aberration corrected beam;

a second lens for converging the shaped aberration corrected beam; and an optical fiber for receiving the converged shaped aberration corrected beam with an improved coupling efficiency;

wherein the beam shaping and aberration correction device, the second lens and the optical fiber are disposed substantially coaxially.

2. An optical coupling system according to claim 1, wherein the beam shaping and aberration correction device expands or contracts the beam cross section in only the horizontal or vertical direction and corrects for astigmatism.

3. An optical coupling system according to claim 2, wherein the beam shaping and aberration correction device includes at least one cylindrical lens.

4. An optical coupling system according to claim 2, wherein the beam shaping and aberration correction device includes a first part for expanding or contracting the beam cross section of the parallel light rays so as to provide diverging or converging light rays and a second part for correcting astigmatism and for providing parallel light rays, the second lens converging the shaped astigmatism corrected beam so as to have substantially the same focusing point of the parallel light rays in both the vertical and horizontal directions.

5. An optical coupling system according to claim 4, wherein the first part includes a concave cylindrical lens and the second part includes a convex cylindrical lens.

6. An optical module comprising the coupling system according to claim 1, further comprising a fixing member for integrally fixing the beam shaping and correcting device and the second lens thereon.

7. An optical module according to claim 6, wherein the beam shaping and aberration correction device includes at least one cylindrical lens.

8. An optical module according to claim 6, wherein the beam shaping and aberration correction device includes a first part for expanding or contracting the beam cross section of the parallel light rays so as to provide diverging or converging light rays and a second part for correcting astigmatism and providing parallel rays, the second lens converging the shaped astigmatism corrected beam so as to have substantially the same focusing point of the parallel light rays in both the vertical and horizontal directions.

9. An optical module according to claim 6, wherein the first part includes a concave cylindrical lens and the second part includes a convex cylindrical lens.

10. An optical coupling system comprising:

a light emitting device for emitting light having different beam spread angles in vertical and horizontal directions;

a first lens for changing the emitted light into parallel light rays;

a beam shaping device for changing an aspect ratio of the beam of the parallel light rays in only the vertical or horizontal direction so as to provide converging light rays; and coupling efficiency improving means for coupling the light rays shaped by the beam shaping device to an optical fiber so that the light rays are converged onto an optical fiber at substantially the same focus point in both the vertical and horizontal directions;

wherein the beam shaping device, the coupling efficiency improving means and the optical fiber are disposed substantially coaxially.

11. An optical coupling system according to claim 10, wherein the coupling efficiency improving means includes at least a cylindrical lens.

12. An optical coupling system according to claim 10, wherein the beam shaping device includes a concave cylindrical lens, and the coupling efficiency improving means includes a convex cylindrical lens and a second lens.

13. An optical module comprising the coupling system according to claim 12, further comprising a fixing member for integrally fixing the concave cylindrical lens, the convex cylindrical lens and the second lens thereon.

14. An optical module comprising the coupling system according to claim 12, wherein the second lens is a converging lens.

15. An optical transmitting module comprising:

a light emitting device for emitting light having different beam spread angles in vertical and horizontal directions;

a first lens for changing the emitted light into first parallel light rays;

a beam shaping and aberration correction device for changing an aspect ratio of a beam cross-section of the first parallel light rays only in the vertical or horizontal direction, for changing the first parallel light rays into second parallel light rays and for correcting for aberration so as to provide a shaped aberration corrected beam; and an optical fiber for receiving the converged light with an improved coupling efficiency;

wherein the beam shaping and aberration correction device, the second lens and the optical fiber are disposed in a fixing member.

16. An optical transmitting module comprising:

a light emitting device for emitting light having different beam spread angles in vertical and horizontal directions;

a first lens for changing the emitted light into parallel light rays;

a beam shaping device for changing an aspect ratio of a beam of the parallel light rays in only the vertical or horizontal direction so as to provide converging light rays; and coupling efficiency improving means for coupling the light rays shaped by the beam shaping device to an optical fiber so that the light rays are converged onto an optical fiber at substantially the same focus point in both the vertical and horizontal directions;

wherein the beam shaping device, the coupling efficiency improving means and the optical fiber are disposed in a fixing member.

* * * * *